United States Patent
Avitan

(10) Patent No.: US 8,016,481 B1
(45) Date of Patent: Sep. 13, 2011

(54) METHOD AND APPARATUS OF MEASURING TEMPERATURE

(75) Inventor: Shimon Avitan, Kiryat Ata (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 0 days.

(21) Appl. No.: 12/725,984

(22) Filed: Mar. 17, 2010

Related U.S. Application Data

(63) Continuation of application No. 11/874,595, filed on Oct. 18, 2007, now Pat. No. 7,726,877.

(60) Provisional application No. 60/886,200, filed on Jan. 23, 2007, provisional application No. 60/950,460, filed on Jul. 18, 2007.

(51) Int. Cl.
*G01K 1/00* (2006.01)
*G01K 7/00* (2006.01)
*H01L 35/00* (2006.01)

(52) U.S. Cl. ........ 374/170; 374/100; 374/103; 327/512; 327/513; 327/538; 327/539; 702/170

(58) Field of Classification Search .......... 374/100, 374/102–103, 170–173; 327/512–513, 538–539; 702/170
See application file for complete search history.

(56) References Cited

U.S. PATENT DOCUMENTS

| | | |
|---|---|---|
| 2006/0116845 A1 | 6/2006 | Pan |
| 2008/0069176 A1 | 3/2008 | Pertijs et al. |

*Primary Examiner* — Lisa M Caputo
*Assistant Examiner* — Jonathan Dunlap

(57) ABSTRACT

The disclosure provides methods and apparatuses of measuring a temperature. A method of measuring a temperature can include generating a time varying signal that varies with time in a known manner, such as having a repeating sawtooth waveform. Further, the method can include generating a first intersecting signal that intersects with the time varying signal at a first time, and generating a second intersecting signal that varies with temperature and intersects with the time varying signal at a second time. Subsequently, the method can construct a pulse signal having a first edge corresponding to the first time and a second edge corresponding to the second time, with the pulse signal having a width corresponding to the temperature.

16 Claims, 9 Drawing Sheets

METHOD AND APPARATUS OF MEASURING TEMPERATURE

INCORPORATION BY REFERENCE

This application is a continuation of U.S. patent application Ser. No. 11/874,595 filed Oct. 18, 2007, which claims the benefit of U.S. Provisional Applications No. 60/886,200, "Novel on Chip Temperature to Digital Converter" filed on Jan. 23, 2007, and No. 60/950,460, "A Novel on Chip Temperature to Digital Converter" filed on Jul. 18, 2007, including all cited references, which are incorporated herein by reference in their entirety.

BACKGROUND

Temperature can be crucial to integrated circuit (IC) performance, especially an IC having high performance requirements, such as a microprocessor. During operation, an IC's temperature can be raised by the IC's operation, especially in the case of high performance IC that requires a large amount of power. Knowing a temperature of an IC can allow actions to be taken to ensure optimum IC performance. For example, if an IC were to begin operating above an optimum temperature range, a cooling fan could be activated to lower the IC temperature to the optimum temperature range.

In one technique to measure a temperature of an IC, an external thermometer can be used. The external thermometer can be attached to an outer package of the IC to measure the temperature of the IC package. The temperature measurement can be transmitted to a controller which can subsequently take action to ensure optimum IC performance. However, use of the external thermometer can add size and complexity, such as un-integrated components and wires, and thus increase required footprint and cost of an IC.

SUMMARY

Aspects of the disclosure can provide a method and an apparatus of measuring a temperature. The method of measuring a temperature can include generating a time varying signal that varies with time in a known manner, such as a signal having a repeating sawtooth waveform. Further, the method can include generating a first intersecting signal that intersects with the time varying signal at a first time, and generating a second intersecting signal that varies with temperature and intersects with the time varying signal at a second time. Subsequently, the method can construct a pulse signal having a first edge corresponding to the first time and a second edge corresponding to the second time, with the pulse signal having a width corresponding to the temperature. Also, the first intersecting signal can be generated based on a semiconductor band-gap voltage, which is substantially constant regardless of temperature, process variations or supply voltage variation.

According to another aspect of the disclosure, the first intersecting signal and the second intersecting signal can be generated based on a proportional to absolute temperature (PTAT) reference. Further, characteristics of the first intersecting signal and the second intersecting signal can be designed to rely on semiconductor device pairs instead of single device, thus the characteristics can be substantially constant regardless of process variations.

The method can generate the time varying signal by charging or discharging a capacitor. Additionally, the method can cyclically charge or discharge the capacitor to generate a plurality of pulses. Therefore, the method can measure the temperature based on the plurality of pulses.

To construct a pulse signal, the method can generate the first edge of the pulse when the time varying signal substantially equals the first intersecting signal, and generate the second edge of the pulse when the time varying signal substantially equals the second intersecting signal. Also, the method can convert the width of the pulse into a digital value. To do this, a counter can be activated by the pulse to count cycles of a clock signal.

In addition, a calibration process can be used to further remove errors due to process variation, power supply variation and device mismatch.

Aspects of the disclosure can provide a temperature measuring apparatus that measures a temperature. The apparatus can include a reference signal generator, and a pulse constructor. The reference signal generator can generate three signals, a time varying signal that varies with time in a known manner, a first intersecting signal that intersects the time varying signal at a first time and a second intersecting signal that varies with the temperature and intersects the time varying signal at a second time. Based on the three signals, the pulse constructor can construct a pulse signal having a first edge corresponding to the first time and a second edge corresponding to the second time, therefore a width of the pulse can correspond to the temperature.

Additionally, aspects of the disclosure can provide a semiconductor device that measures a temperature. The semiconductor device can include a reference signal generator and a pulse constructor that are integral with the semiconductor device. The reference signal generator and the pulse constructor are made of semiconductor devices, such as MOS transistors, bipolar transistors, and resistors.

BRIEF DESCRIPTION OF THE DRAWINGS

Various exemplary embodiments of this disclosure will be described in detail with reference to the following figures, wherein like numerals reference like elements and wherein.

DETAILED DESCRIPTION OF EMBODIMENTS

Aspects of this disclosure can provide a method and an apparatus for measuring a temperature. The method and apparatus can be implemented with a semiconductor device, such as an IC chip, to measure the IC chip's temperature.

Figure 1:
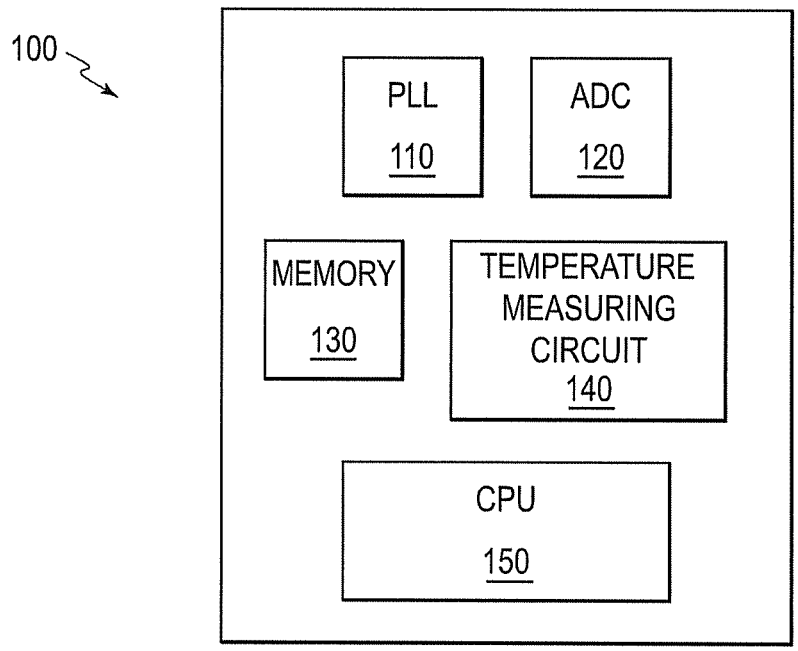
FIG. 1 shows an example of an IC chip with an on chip temperature-measuring circuit.

FIG. 1 shows an example of an IC chip 100 that can include an on chip temperature-measuring circuit. As shown in FIG. 1, IC chip 100 can include various functional blocks, for example, block 110 can be a phase locked loop (PLL), block 120 can be an analog to digital converter (ADC), block 130 can be a memory module, and block 150 can be a CPU.

As also shown in FIG. 1, the IC chip 100 can include a temperature-measuring circuit 140 that can be integrated as part of the IC chip 100. The temperature-measuring circuit 140 can be constructed of IC components, such as MOS transistors, bipolar transistors, and poly resistors to measure a temperature of the IC chip 100 during operation. Moreover, the temperature-measuring circuit 140 can convert the temperature measurement into a digital value that corresponds to the temperature of the IC chip 100. The digital value can be subsequently used to monitor the temperature of the IC chip 100. As will be apparent from the description that follows, the on chip temperature-measuring circuit 140 can achieve many benefits, such as small space, low cost and high convenience.

Figure 2:
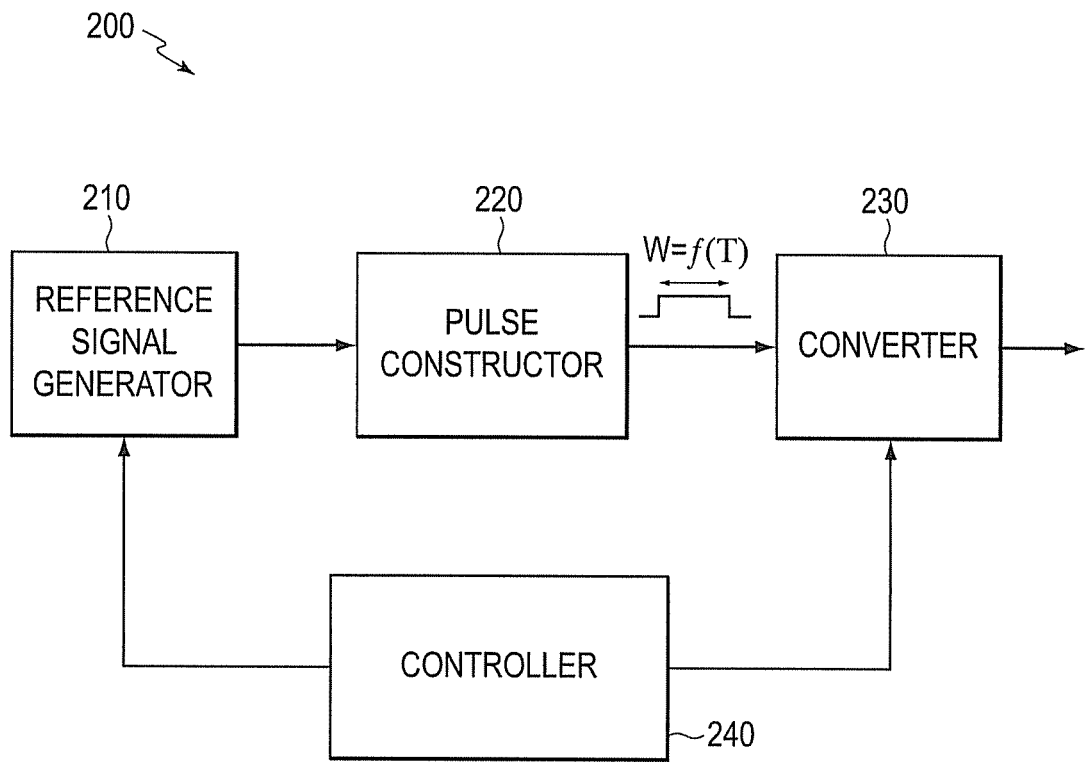
FIG. 2 shows a block diagram showing an example of a temperature-measuring circuit.

FIG. 2 shows a block diagram illustrating an example of a more detailed temperature-measuring circuit 200. The temperature-measuring circuit 200 can include a reference signal generator 210, a pulse constructor 220, and a converter 230. The temperature-measuring circuit 200 can also include a controller 240 that can control the operation of the temperature-measuring circuit 200. The components of the temperature-measuring circuit 200 can be coupled as shown in FIG. 2.

During operation, the reference signal generator 210 can provide reference signals to the pulse constructor 220. Based on the reference signals, the pulse constructor 220 can construct a pulse having a pulse width that is related to a temperature, such as the temperature of IC chip 100. The converter 230 can receive and convert the width of the pulse into a digital value, for example by counting a number of system clock cycles that corresponds to a width of the pulse. The above operations can be driven by the controller 240, which can provide control signals to the reference signal generator 210, pulse constructor 220 and converter 230 to coordinate their respective operations.

In an embodiment, the reference signal generator 210 can generate three reference signals, a time varying signal $V_S$, a first intersecting signal $V_C$, and a second intersecting signal $V_T$. As described in greater detail below, the first intersecting signal $V_C$ and the second intersecting signal $V_T$ intersect with the time varying signal $V_S$. The pulse constructor 220 constructs a pulse having a first edge corresponding to the intersection of the time varying signal $V_S$ and the first intersecting signal $V_C$ and a second edge corresponding to the intersection of the time varying signal $V_S$ and the second intersecting signal $V_T$. While the first edge is a rising edge, the second edge is a falling edge. On the other hand, while the first edge is a falling edge, the second edge is a rising edge. Again, width of the pulse signal is related to temperature.

Figure 3A:
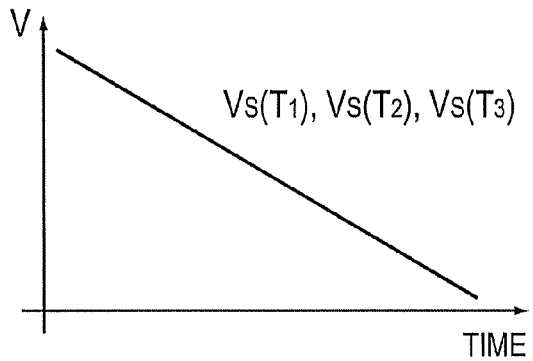
FIGS. 3A, B and C show three examples of reference signals.

FIG. 3A shows an example of a time varying signal $V_S$. The time varying signal $V_S$ can have an amplitude that varies with time. The time varying signal $V_S$ in FIG. 3A varies linearly with time, having a constant slope. The time varying signal $V_S$ can be temperature independent, and thus substantially constant regardless of temperature. In other words, the time varying signal $V_S$ can be substantially the same at different temperatures, such as T1, T2 and T3.

Figure 3B:
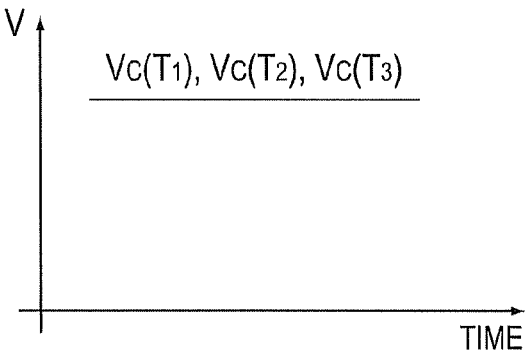

FIG. 3B shows an example of a first intersecting signal $V_C$. As can be seen, the first intersecting signal $V_C$ can be both time and temperature independent. Therefore in an embodiment, the first intersecting signal $V_C$ can be substantially the same at different temperatures, such as T1, T2, and T3, and at different times.

Figure 3C:
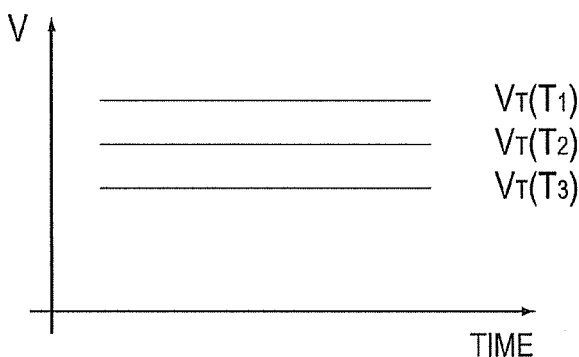

FIG. 3C shows an example of a second intersecting signal $V_T$. The second intersecting signal $V_T$ can have an amplitude that is substantially time independent, but varies with temperature. In other words, the second intersecting signal $V_T$ can have a non-zero temperature coefficient, and thus have different amplitudes at different temperatures. The temperature characteristic of the second intersecting signal $V_T$ can be represented by $V_T(T1)>V_T(T2)>V_T(T3)$, where T1>T2>T3.

Figure 4:
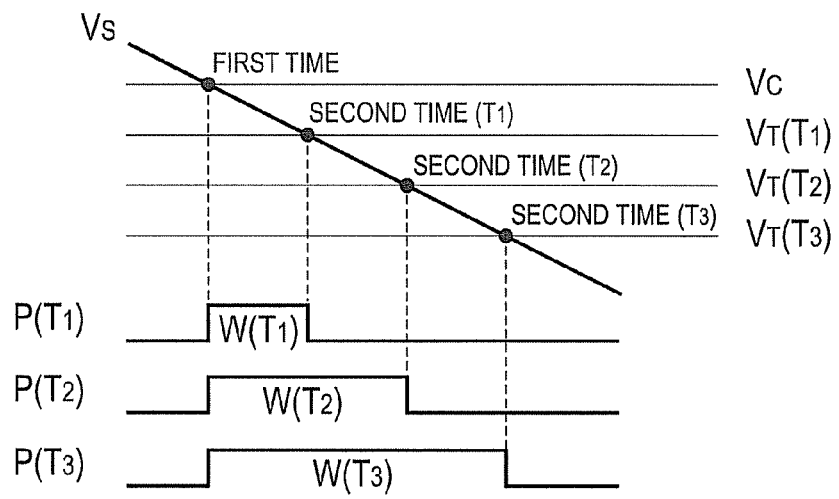
FIG. 4 shows an example of a pulse having a width related to temperature.

FIG. 4 shows a plot illustrating an example of a technique of constructing a pulse signal having a width related to temperature. The technique uses the time varying signal $V_S$ of FIG. 3A, the first intersecting signal $V_C$ of FIG. 3B and the second intersecting signal $V_T$ of FIG. 3C for illustration. As can be seen, the time varying signal $V_S$ can vary with time, and thus intersect with the other two time independent signals. More specifically, the time varying signal $V_S$ can intersect with the first intersecting signal $V_C$ at a first time and intersect with the second intersecting signal $V_T$ at a second time. According to the intersections, the technique can generate a first edge of a pulse corresponding to the first time and a second edge of the pulse corresponding to the second time. In other words, the first edge can be generated according to an intersection of the time varying signal $V_S$ and the first intersecting signal $V_C$, and the second edge can be generated according to an intersection of the time varying signal $V_S$ and the second intersecting signal $V_T$. Consequently, the first edge can be the same for different temperatures, and the second edge can be different for different temperatures. Thus, the width of the pulse signal, which is the time between the first edge and the second edge of the pulse signal, can be different for different temperatures. Therefore, the width of the pulse signal is related to temperature. Using FIG. 4 as an example, the following relationship can be derived:

$$W(T1)<W(T2)<W(T3) \text{ for } T1>T2>T3$$

where W is the width of the pulse signal, and T1, T2 and T3 are three different temperatures.

As described above, the converter 230 can convert the width of the pulse into a digital value. Thus, for different temperatures, the pulse will have different widths, and thus the digital value will be different. The digital value can subsequently be used to determine further actions, such as activating a cooling fan.

Various techniques can be used by the reference signal generator 210 to generate the three reference signals having the characteristics described above. For example, the two intersecting signals can be generated based on a band-gap voltage reference circuit, and the time varying signal can be generated by charging (or discharging) a capacitor.

Figure 5:
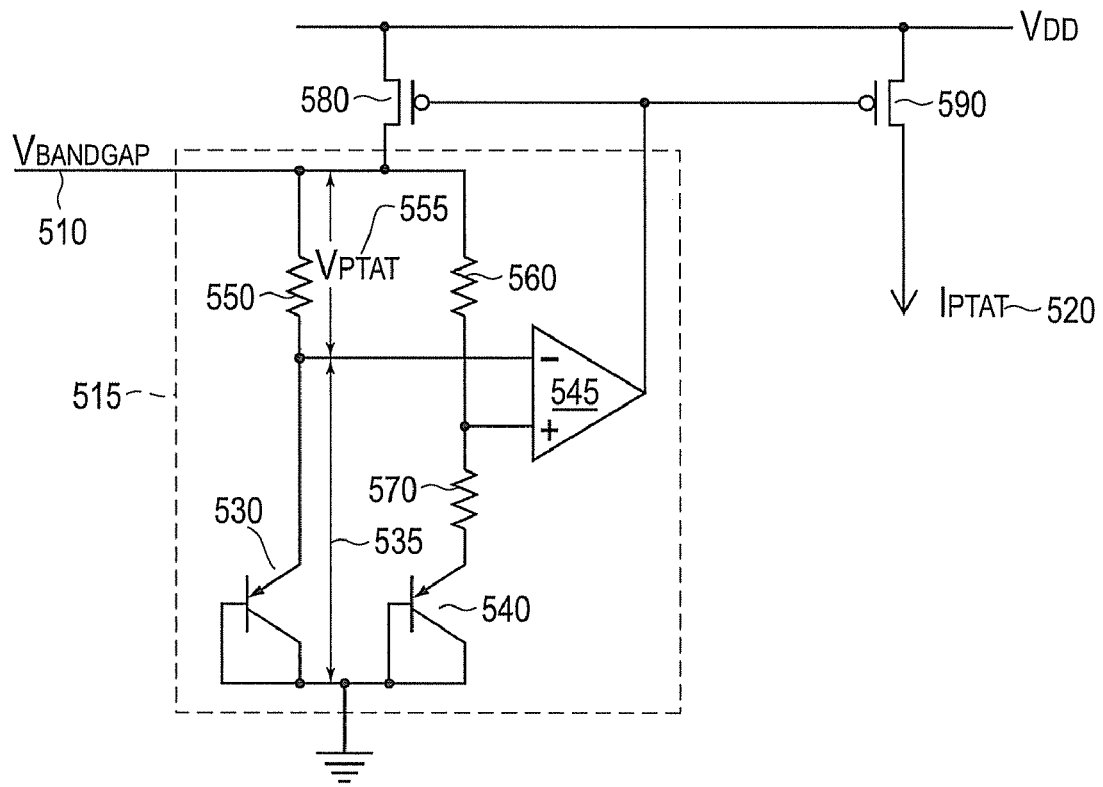
FIG. 5 shows an example of IC circuit generating a band-gap voltage reference and a proportional to absolute temperature (PTAT) current signal.

FIG. 5 shows a schematic diagram of an example of a band-gap voltage reference circuit that can generate two references, a band-gap voltage reference 510 and a proportional to absolute temperature (PTAT) current reference 520. As can be seen, voltage 510 can include two voltage components, a first voltage component 555 that is a voltage across resistor 550, and a second voltage component 535 that is an emitter-base voltage of bipolar transistor 530.

The first voltage component 555 can be related to a current of resistor 570. The current of resistor 570 can be proportional to absolute temperature (PTAT), if resistor 570, operational amplifier 545 and a matching pair of bipolar transistors 530 and 540 are connected as shown in block 515. Consequently, a current of resistor 560, which is equal to the current of resistor 570, is also PTAT. Therefore, a voltage of resistor 560 can be PTAT, which can cause the voltage of resistor 550 to be PTAT. Thus, the voltage of resistor 550 can be represented by $\alpha T$, where $\alpha$ a is a positive temperature coefficient, and T is the absolute temperature. The positive temperature coefficient $\alpha$ is related to two ratios. One ratio is a size ratio of resistors 560 and 570, the other ratio is a size ratio of matching bipolar transistors 530 and 540. Generally, the positive temperature coefficient $\alpha$ can be easily adjusted by adjusting the two ratios.

The emitter-base voltage of bipolar transistor 530 can have a negative temperature coefficient. Therefore, the second component of voltage 510 can have a negative temperature coefficient, while the first component can have an adjustable positive temperature coefficient. Therefore, the positive temperature coefficient of the first component can be adjusted to cancel the negative temperature coefficient, such that voltage 510 can be substantially temperature independent. Voltage 510 is mainly the semiconductor band-gap voltage. Therefore, voltage 510 is usually called band-gap voltage reference. While voltage 510 is band-gap voltage reference, currents flowing through resistors 550 and 560 are both PTAT currents, which results in current 520 to be a PTAT current when PMOS transistors 580 and 590 are a matching pair.

An advantage of the reference generating circuit shown in FIG. 5 is that the band-gap voltage reference 510 can be substantially independent of process variations. Generally, semiconductor device parameters may vary significantly with manufacturing processes. However, a size ratio of matching semiconductor device pair can be accurately adjusted and can be relatively stable with process variations. As described above, the band-gap voltage reference 510 depends on ratios of semiconductor device pairs. Consequently, the band-gap voltage reference 510 can be substantially constant with process variations.

Figure 12:
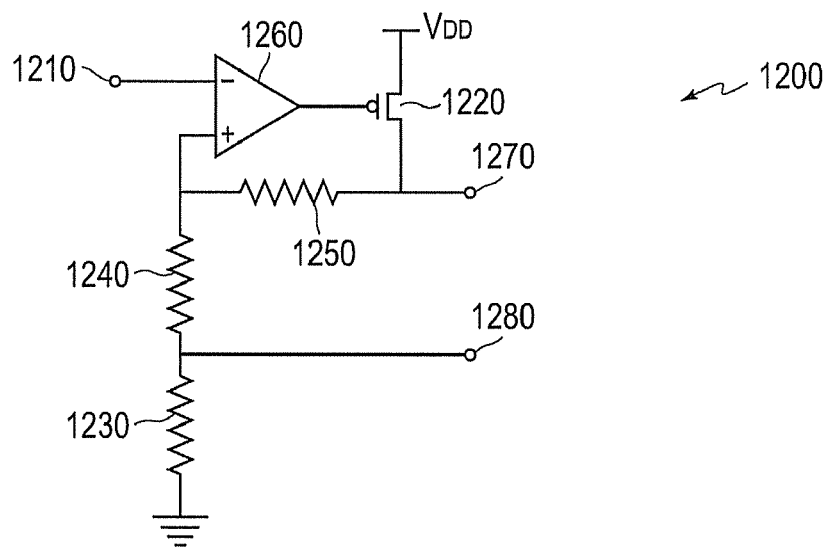
FIG. 12 shows a schematic diagram of a voltage scaling circuit example.

The reference signals generated by the circuit shown in FIG. 5 may not have the desired amplitude, for example, the band-gap voltage reference is about 1.28V. Scaling circuit and biasing circuit can be used to achieve voltage references of desired amplitude. For example, FIG. 12 shows an example of a voltage scaling circuit 1200. The voltage scaling circuit 1200 can scale an original voltage signal 1210 to a first scaled voltage signal 1280 by a factor decided by resistor pair 1240 and 1230. In addition, the voltage scaling circuit 1200 can scale the original voltage signal 1210 to a second scaled voltage signal 1270 by a factor decided by resistors 1250, 1240 and 1230. While the first scaled voltage 1280 is smaller than the original voltage signal 1210, the second scaled voltage 1270 is larger than the original voltage signal 1210. The first and second scaled voltage signals 1270 and 1280 can have similar temperature characteristic as the original voltage signal 1210. For example, when the original voltage signal 1210 is a band-gap voltage, the first and second scaled voltage signals 1270 and 1280 can be temperature independent. This technique can be used to generate the first intersecting signal $V_C$ of desired value and can generate other constant voltage references that may be used in other part of the temperature measuring circuit.

Figure 6:
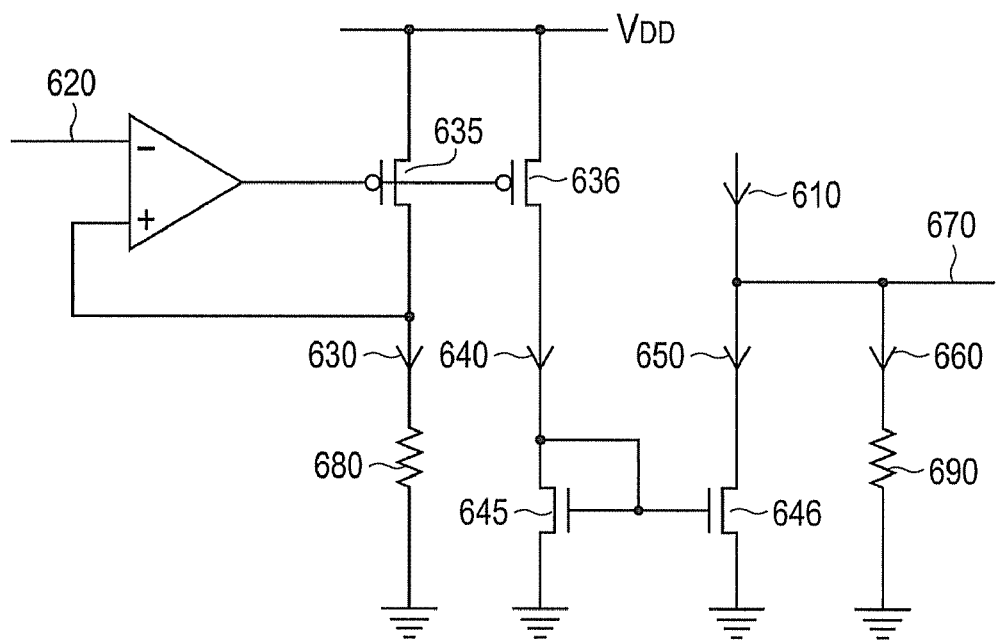
FIG. 6 shows a schematic diagram of a scaling and offsetting IC circuit example.

The PTAT current 520 can be scaled and offset to generate the second intersecting signal $V_T$ of desired characteristic. FIG. 6 shows a schematic diagram of an example of a scaling and offsetting circuit that can generate a second intersecting signal having a voltage of desired temperature coefficient and desired offset. As shown in FIG. 6, a current 610 is a PTAT current, such as the PTAT current 520 in FIG. 5, and a voltage reference 620 is a constant voltage reference generated by the above described technique. Thus, voltage reference 620 can be temperature independent. A current 630 can be related to the voltage reference 620 and resistor 680. As a result, current 630 can be substantially temperature independent. PMOS transistors 635 and 636 can be matching transistors, and NMOS transistors 645 and 646 can be matching transistors. Thus, current 650 can be related to current 630, which is substantially temperature independent. As can be seen, voltage 670 can be represented by equation 1:

$$V_{670}=R_{690}\times(I_{610}-I_{650})=R_{690}\times R_{610}-R_{690}\times I_{650} \quad (1)$$

Voltage 670 can have a first component and a second component. The first component can be related to current 610, which is a PTAT current. The second component can be related to current 650, which is substantially constant regardless of temperature. Therefore, adjusting the first component can achieve a desired temperature coefficient, and adjusting the second component can achieve a desired constant offset. In one embodiment, the first component can be adjusted by a ratio of resistors 690 and 570, and a ratio of PMOS transistors 590 and 580. The second component can be adjusted by a ratio of resistors 690 and 680, and a ratio of NMOS transistors 645 and 646. In an embodiment, resistors 690, 680 and 560 are matching resistors. As a result, the generated voltage reference does not depend on single semiconductor device parameter, but depend on ratios of matching semiconductor device pairs. Therefore, the generated voltage reference can have substantially consistent characteristics regardless of process variation. Consequently, voltage 670 can have the characteristic as shown in FIG. 3C, and can be used as the second intersecting signal $V_T$.

Figure 7:
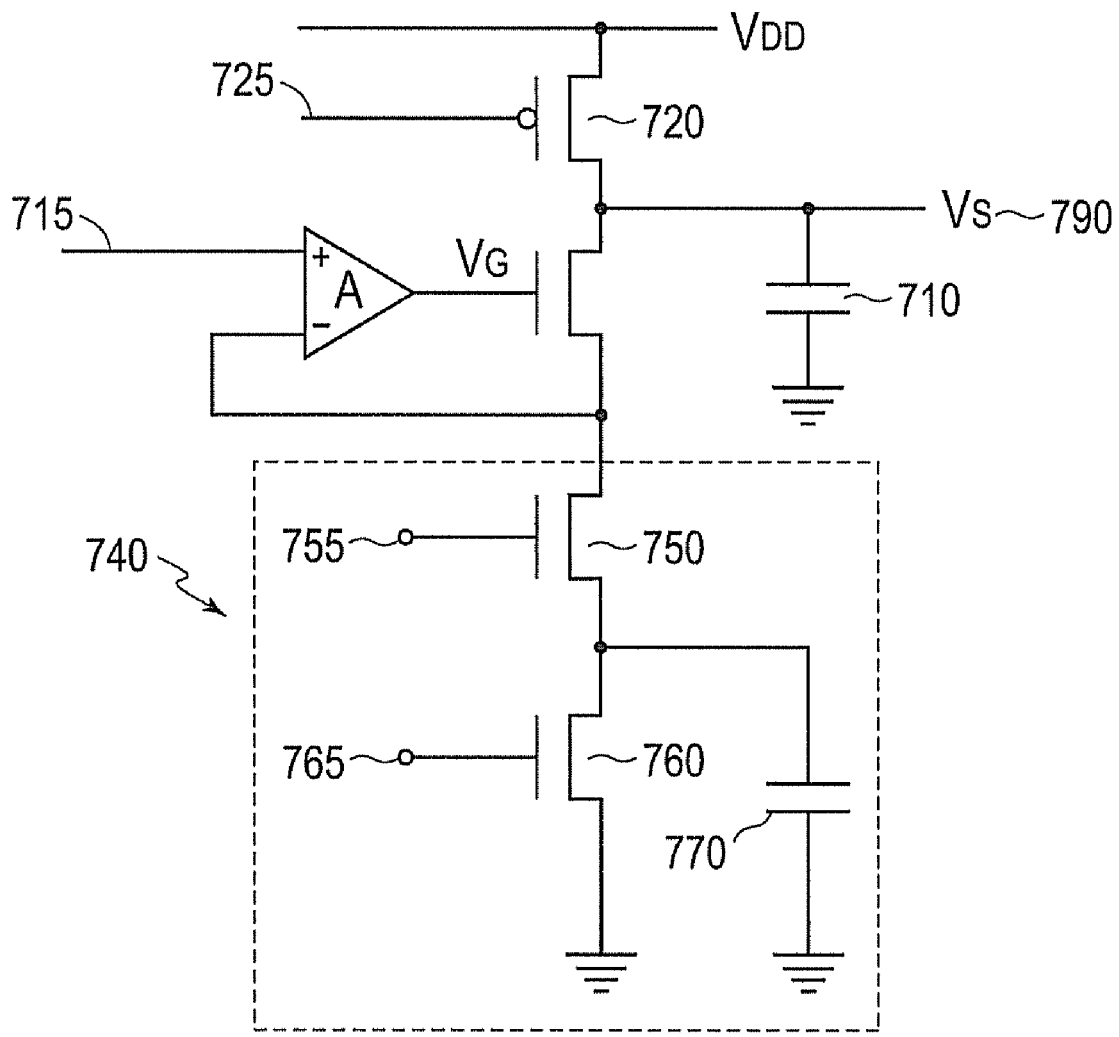
FIG. 7 shows a schematic diagram of an IC circuit example generating a time varying signal.

One of the techniques to generate a temperature independent, time varying signal $V_S$ is to charge or discharge a capacitor. FIG. 7 shows a schematic diagram of an IC circuit 700 that can generate a time varying signal $V_S$, for example. The IC circuit 700 can include a switch that is made of a PMOS transistor 720, a capacitor 710, and a current sink represented by block 740. The IC circuit 700 can have two phases controlled by a control voltage 725. The two phases can be a reset phase and an integration phase. When the control voltage 725 is low, the PMOS transistor 720 is turned on, the capacitor 710 is charged quickly by the supply voltage, and thus voltage 790 is high. This is the reset phase. When the control voltage 725 is high, PMOS transistor 720 is turned off, a current driven by the current sink 740 can discharge capacitor 710, thus voltage 790 is reduced. This is the integration phase. Ideally, when the current driven by the current sink 740 is constant, voltage 790 can decrease linearly with time. However, voltage 790 can be non-linear due to reasons like initialization effect, or boundary effect, for example, at a beginning of discharging, or when voltage 790 is quite low. Linearity provides high predictability, which can improve efficiency.

Figure 8:
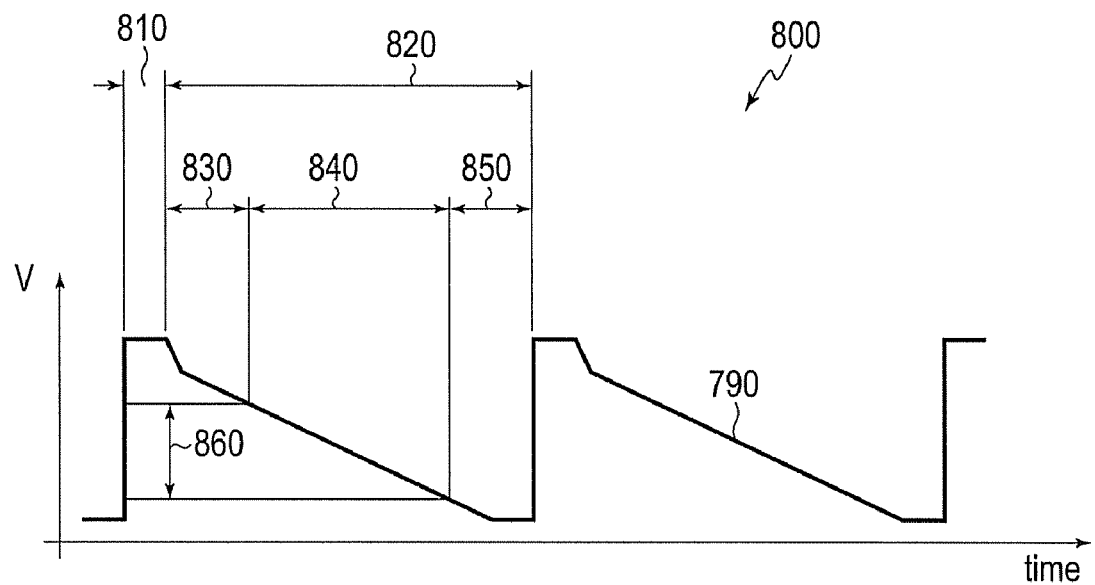
FIG. 8 shows an example of a waveform characteristic of a time varying signal.

FIG. 8 shows an example of a waveform graph 800 of a time dependent voltage 790 $V_S$ based on a constant driving current from the current sink 740. As shown, the waveform can generally resemble a sawtooth or repeating ramp pattern. Two phases indicated by 810 and 820 are the reset phase and the integration phase respectively. Integration phase 820 can be further divided into region 830, region 840 and region 850. Particularly, the time characteristic of voltage 790 can be difficult to predict in region 830 and 850 due to initialization and boundary effect. In region 840, the time characteristic is substantially linear, and a time slope of voltage 790 can be predicted based on the constant driving current from the current sink and the capacitance of capacitor 710. Therefore, voltages of intersecting signals are suitably adjusted, so that intersections with $V_S$ occur inside region 840. As a result, the first intersecting signal $V_C$ and the second intersecting signal $V_T$ are suitably adjusted to be in a voltage range 860 corresponding to region 840, this can be realized by appropriately scaling and offsetting the two intersecting signals. Moreover, generally, IC circuit is designed to work in a temperature range, such as from 0° to 125°. Then, it is preferred that during this temperature range, the first intersecting signal $V_C$ and second intersecting signal $V_T$ are designed to be in the voltage range 860. Therefore, during region 840, voltage 790 can have similar time characteristic as the time varying signal $V_S$ shown in FIG. 3A.

Current sink can be implemented by a switch capacitor circuit as shown inside block 740 for example. The switch capacitor circuit seen in block 740 can include two MOS transistors 750 and 760 as switches, and a capacitor 770. Two control signals 755 and 765 can cyclically control the MOS transistors 750 and 760 to turn on alternatively. Thus, the capacitor 770 can be charged and discharged alternatively. Therefore, an average current during a cycle can be determined by voltage 715 and capacitance of capacitor 770. Consequently, the time slope of voltage 790 in region 840 can be determined by voltage 715 and a ratio of capacitors 770 and 710. In one embodiment, capacitor 770 and capacitor 710 can be matching MOS capacitors, and then the ratio of capacitors 770 and 710 can be substantially constant with temperature and process variations. Voltage 715 can be a constant voltage reference that is scaled based on the band-gap voltage reference 510. Therefore, voltage 715 can be substantially constant regardless of temperature and process variations. In such an embodiment, the time slope in region 840 can be substantially constant, independent of temperature and process variations.

Figure 9:
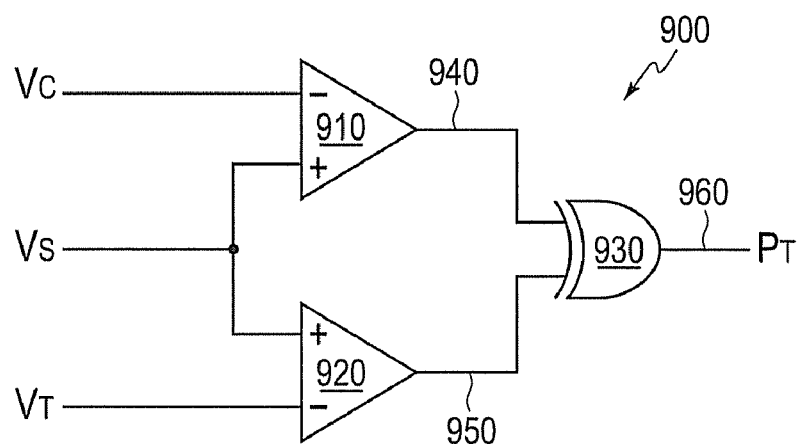
FIG. 9 shows a schematic diagram of a pulse constructor example.

The three reference signals can be fed into the pulse constructor 220 to construct the pulse signal having the width related to temperature. FIG. 9 shows a schematic diagram of an example of a pulse constructor 900. The schematic diagram can include two comparators 910, 920 and a XOR circuit 930. The first comparator 910 can compare the time varying signal $V_S$ and the first intersecting signal $V_C$, and then output a first comparison result 940. The second comparator 920 can compare the time varying signal $V_S$ and the second intersecting signal $V_T$, and then output a second comparison result 950. The XOR circuit 930 can use the first and second comparison results to construct a pulse signal 960. For example, when the time varying signal $V_S$ is larger than both the first intersecting signal $V_C$ and second intersecting signal $V_T$, both the first and second comparison results 940 and 950 are one, thus the pulse signal 960 outputted by the XOR circuit 930 can be zero. The pulse signal 960 can continue to be zero until the time varying signal $V_S$ intersects the first intersecting signal $V_C$. When this happens, the first comparison result 940 can change to zero, while the second comparison result 950 can continue to be one. Therefore, the pulse signal 960, which is the result of the XOR operation of the two comparison results, can become one, thus a first edge of the pulse signal 960 is generated. The pulse signal 960 can continue to be one until the time varying signal $V_S$ intersects second intersecting signal $V_T$. When this happens, the second comparison result 950 can change to zero, while the first comparison result 940 can continue to be zero. Therefore, the pulse signal 960 can become zero, thus a second edge of the pulse signal 960 can be generated.

As mentioned in the above description, the three reference signals generated by the schematic diagrams can be based on silicon band-gap voltage and ratios of matching semiconductor devices. The silicon band gap voltage and the ratios of matching semiconductor devices can be substantially consistent regardless of process variations. As a result, the three reference signals can be substantially consistent regardless of process variations. Consequently, the width of the pulse signal can be substantially constant regardless of process variations.

Figure 10:
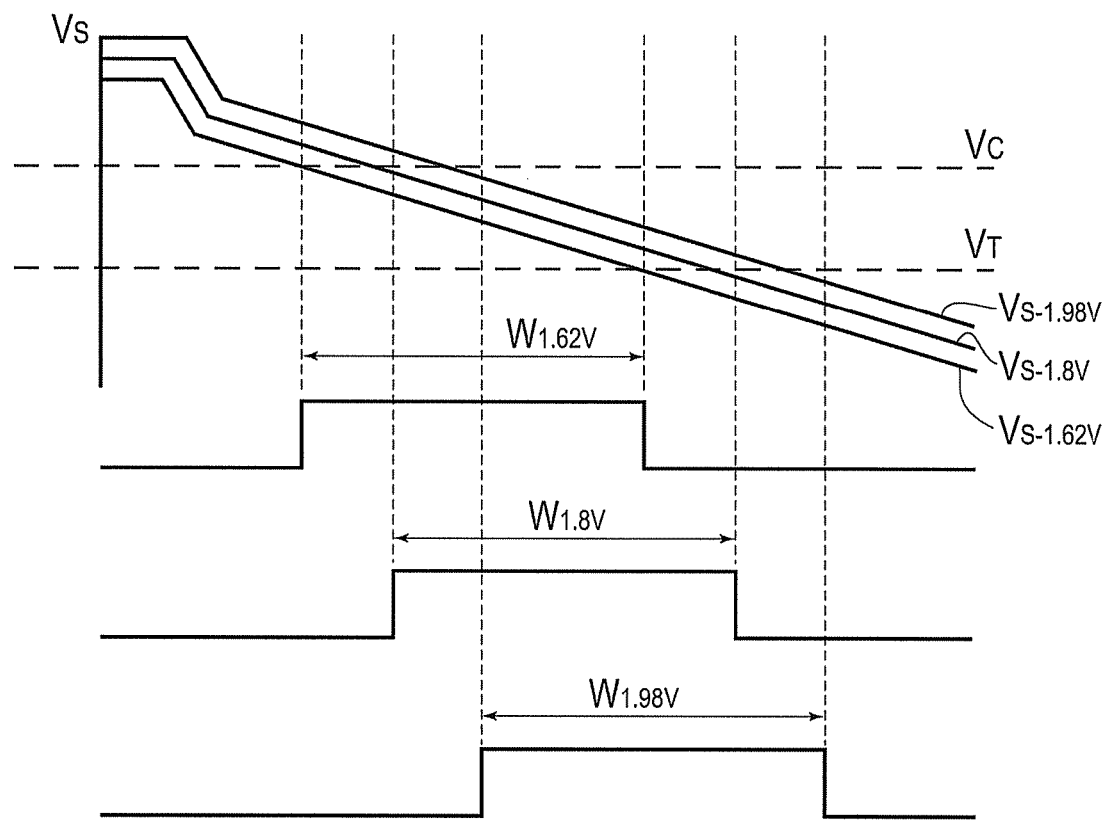
FIG. 10 shows waveforms illustrating an example of a pulse signal constructed under different supply voltages.

In addition, the width of the pulse signal can be substantially constant regardless of supply voltage variations. FIG. 10 shows an example of a pulse signal constructed under three different supply voltages 1.98V, 1.8V and 1.62V. While the time varying signal $V_S$ can be offset due to supply voltage variation, the time slope of the time varying signal $V_S$ can be substantially constant with supply voltage variation, as shown by $V_{S\text{-}1.98V}$, $V_{S\text{-}1.8V}$, and $V_{S\text{-}1.62V}$ in FIG. 10. Under the same temperature, the first intersecting signal $V_C$ and the second intersecting signal $V_T$ can be substantially constant with supply voltage variation. Thus, though the first edge and second edge of the pulse signal can be constructed at different time, the width of the pulse signal can be substantially constant regardless of supply voltage variation, as shown by $W_{1.98V}$, $W_{1.8V}$, and $W_{1.62V}$.

Figure 14A:
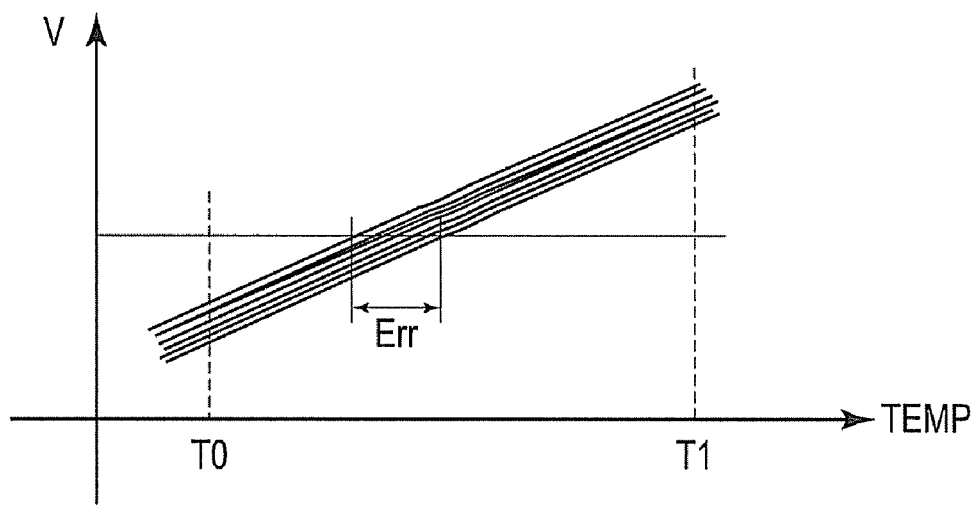
FIGS. 14A and 14B show an example of a measured signal before and after calibration.
Figure 14B:
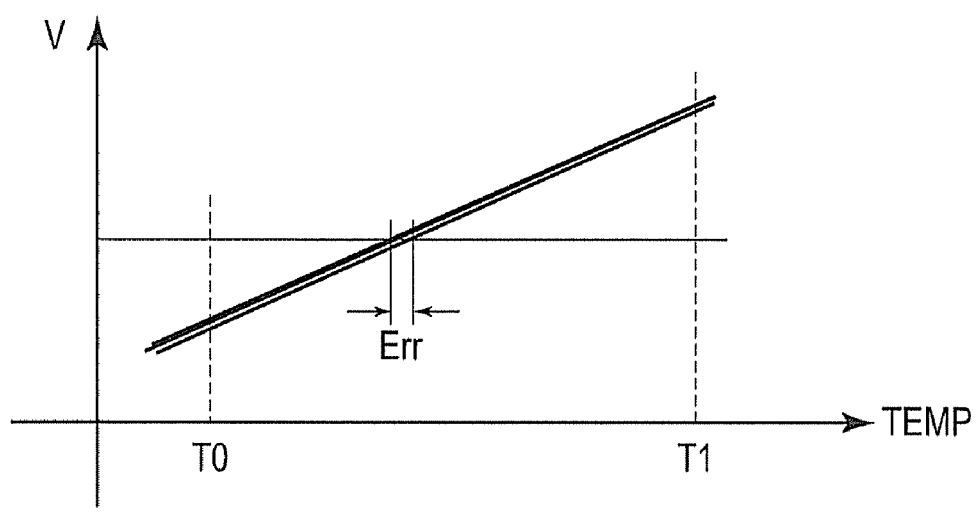

Furthermore, a calibration process can be used to remove errors due to process variation, power supply variation, and device mismatch. FIG. 14A shows an example of a measured signal that varies with temperature. The measured signal for different dies may vary over a large range due to the mentioned variations. In an embodiment, an offset can be calibrated for each die to adjust the measured signal to a calibrated signal. FIG. 14B shows an example of a calibrated signal varies with temperature. The calibrated signal from different dies may vary over a small range. Therefore, the calibrated signal can have less error than the measured signal.

Converter 230 can be implemented by using a counter. The pulse signal can be used to enable the counter to count cycles of a clock signal. Then a number of clock cycles can be used to determine the temperature.

Figure 11:
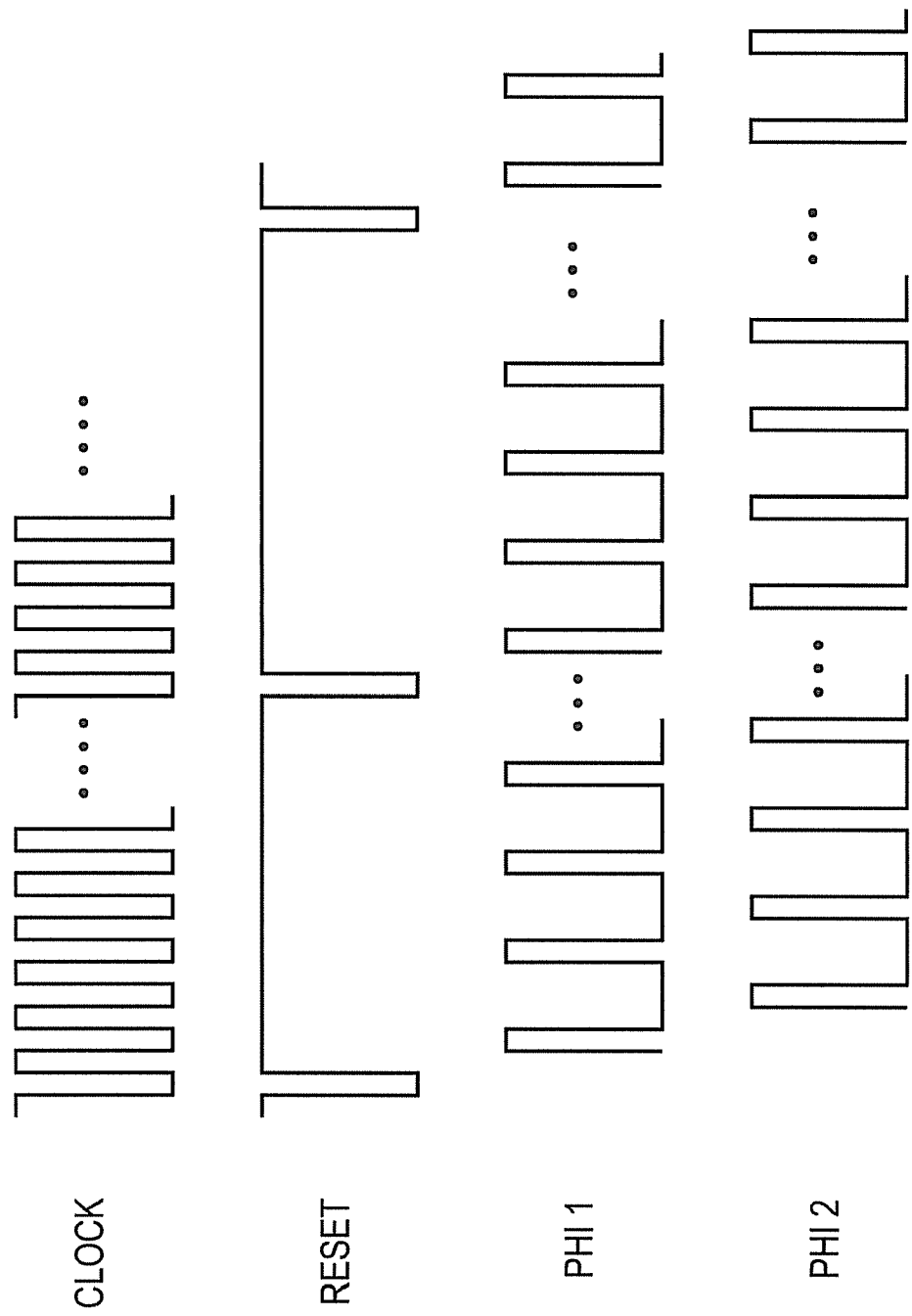
FIG. 11 shows an example of control signal waveforms provided by a controller.

As described, controller 240 can provide control signals to reference signal generator 210 and converter 230. FIG. 11 shows an example of control signal waveforms that can be provided by controller 240. A CLOCK signal can be the clock signal for the counter to count cycles during an elapse time between the first edge and second edge of the pulse signal. A RESET signal can be the control signal 725 to control the reset phase and the integration phase of the time varying signal $V_S$. PHI and PH2 signals can be the two non-overlap control signals 755 and 765 applied to MOS transistors 750 and 760 to control charging and discharging capacitor 770.

As can be seen, the RESET signal can be a cyclic signal. In consequence, the pulse signal can be a cyclic signal, and can include two or more pulses. Then two or more pulses can be used to determine the temperature. For example, an average of the two or more pulses can be used to determine the temperature.

Figure 13:
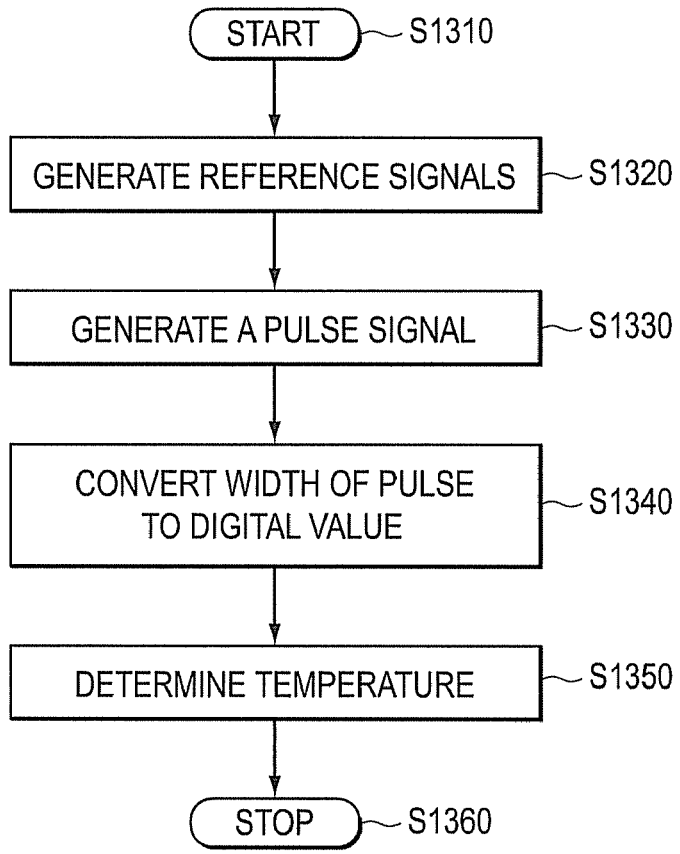
FIG. 13 shows a flow chart outlining an exemplary method of measuring a temperature.

FIG. 13 shows a flow chart outlining a suitable method of measuring a temperature employing the circuitry shown and described above. The method begins in step S1310, and proceeds to step S1320 where three reference signals are generated. The three reference signals can be a temperature independent, time varying signal, a first intersecting signal and a second intersecting signal, the first and second intersecting signals are suitably be time independent. Additionally, the second intersecting signal suitably varies with the temperature. The time varying signal can vary with time, and can intersect with the first intersecting signal at a first time, and intersect with the second signal at a second time.

The process then proceeds to step S1330, where a pulse signal is generated. The pulse signal can be generated based on the three reference signals. A first edge of the pulse signal can be generated at the first time when the time varying signal intersects the first intersecting signal. A second edge of the pulse signal can be generated at the second time when the time varying signal intersects the second intersecting signal. Therefore, a width of the pulse signal, which is an elapse of time between the first edge of the pulse and the second edge of the pulse, can be related to the temperature.

Subsequently, the process proceeds to step S1340, where the width of the pulse is converted into a digital value. Then the digital value can correspond to the temperature. For example, a counting process can be activated by the pulse signal, such that a number counted during the elapse time between the first edge and second edge of the pulse can correspond to the temperature.

The process then proceeds to step S1350, where the temperature can be determined based on the digital value. Therefore, further actions can be determined based on the temperature. The temperature measuring process then proceeds to step S1360, and terminates.

As shown in FIG. 1, the temperature measuring circuit can be incorporated into an IC chip with other circuitry. It will be appreciated that the IC chip can include various designs, function(s), and components, such as CPU, memory, ADC, PLL, ASIC, PLA and the like. Further, while the temperature measuring device has been described as part of an IC ship, it should be understood that the temperature measuring device can be associated with any substrate where a temperature measurement is desired.

While the invention has been described in conjunction with the specific embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A temperature measuring apparatus that measures a temperature, comprising:
    a reference signal generator that generates a time varying signal that varies with time, a first intersecting signal that intersects the time varying signal at a first time and a second intersecting signal that varies with a temperature and intersects the time varying signal at a second time;
    a pulse constructor that constructs a pulse signal having a first edge corresponding to the first time and a second edge corresponding to the second time, a width of the pulse corresponding to the temperature; and
    a converter that converts a width of the pulse to a value which corresponds to the temperature.

2. The temperature measuring apparatus according to claim 1, wherein the first intersecting signal remains substantially constant over a relevant temperature range.

3. The temperature measuring apparatus according to claim 2, wherein the reference signal generator further comprises:
    a band-gap voltage reference generator that generates a band-gap voltage reference, the first intersecting signal being based on the band-gap voltage reference.

4. The temperature measuring apparatus according to claim 1, wherein the second intersecting signal varies proportionally to the temperature.

5. The temperature measuring apparatus according to claim 4, wherein the reference signal generator further comprises:
    a proportional to absolute temperature (PTAT) current reference generator that generates a PTAT current, the second intersecting signal being based on the PTAT current reference.

6. The temperature measuring apparatus according to claim 5, wherein the reference signal generator further comprises:
    a scaling and offsetting circuit that scales and offsets the PTAT current reference to generate the second intersecting signal.

7. The temperature measuring apparatus according to claim 1, wherein the converter further comprises:
    a counter that counts a number of clock cycles that occur during an elapsed time between the first edge and second edge of the pulse signal.

8. The temperature measuring apparatus according to claim 7, wherein the counter is enabled by the pulse signal to count the number of clock cycles that occur between the first edge and second edge of the pulse signal.

9. The temperature measuring apparatus according to claim 1, wherein the pulse constructor further comprises:
    a first comparator that calculates a first comparing result by comparing the time varying signal and the first intersecting signal;
    a second comparator that calculates a second comparing result by comparing the time varying signal and the second intersecting signal; and
    a XOR logic circuit that calculates the pulse signal by performing XOR operation on the first comparing result and the second comparing result.

10. The temperature measuring apparatus according to claim 1, further comprising:
    a controller that provides control signals to the reference signal generator to set the time varying signal to an initial value, and vary an amplitude of the time varying signal with time.

11. The temperature measuring apparatus according to claim 10, wherein the controller controls the reference signal generator to cyclically set the time varying signal to an initial value, and varies the amplitude of the time varying signal.

12. The temperature measuring apparatus according to claim 11, wherein the pulse constructor constructs two or more pulses, and the temperature is determined based on an average of the two or more pulses.

13. The temperature measuring apparatus according to claim 1, wherein the time varying signal varies proportionally to time during a time duration.

14. The temperature measuring apparatus according to claim 1, wherein the reference signal generator further comprises:
    a first capacitor that is charged or discharged with a current, the time varying signal being a voltage of the capacitor.

15. The temperature measuring apparatus according to claim 14, wherein the reference signal generator further comprises:
    a constant current sink that drives a constant current to charge or discharge the first capacitor.

16. The temperature measuring apparatus according to claim 15, wherein the constant current sink includes a switch capacitor circuit having a second capacitor that is a matching capacitor with the first capacitor.

* * * * *